United States Patent [19]

Hubbard et al.

[11] Patent Number: 4,582,093

[45] Date of Patent: Apr. 15, 1986

[54] FIBER OPTIC DUCT INSERT

[75] Inventors: Charles E. Hubbard, Harper Woods; Donald E. Berkemeier, Bloomfield Hills, both of Mich.

[73] Assignee: Libbey-Owens-Ford Company, Toledo, Ohio

[21] Appl. No.: 557,841

[22] Filed: Dec. 5, 1983

[51] Int. Cl.⁴ .............................................. F16L 9/18
[52] U.S. Cl. ..................................... 138/111; 174/95
[58] Field of Search ................. 138/111, 115; 174/95, 174/97

[56] References Cited

U.S. PATENT DOCUMENTS

| | | | |
|---|---|---|---|
| 111,727 | 2/1871 | Conley | 138/115 |
| 2,908,949 | 10/1959 | Frehse | 138/111 |
| 3,529,632 | 9/1970 | Johns | 138/111 |
| 3,581,523 | 6/1971 | Bartholomew | 74/501 P |
| 4,112,708 | 9/1978 | Fukuda | 74/501 P |
| 4,273,070 | 6/1981 | Hoefelmayr | 138/111 |

FOREIGN PATENT DOCUMENTS

| | | | |
|---|---|---|---|
| 1061856 | 7/1959 | Fed. Rep. of Germany | 174/95 |
| 773584 | 11/1934 | France | 138/111 |
| 3823 | of 1901 | United Kingdom | 138/115 |

*Primary Examiner*—John W. Shepperd
*Attorney, Agent, or Firm*—Phillip S. Oberlin

[57] ABSTRACT

The present invention relates to a multi-chambered conduit insert which can be utilized to convert a single chambered conduit into a multi-chambered conduit. In particular, the conduit insert includes a plurality of cooperating longitudinally extending walls having curved outer surface portions and defining a plurality of parallel spaced apart coextensive chambers. When the conduit insert is inserted within the single chambered conduit, the curved outer surface portions of at least one of the chambers in the lower half of the insert is in line-to-line contact with the adjacent inner supporting surface of the single chambered duct, thus causing only minimal contact with the interior wall of the existing conduit and enabling the multi-chambered conduit insert to be fed into the existing conduit with the expenditure of minimal energy. In the preferred embodiment of the invention, two identical conduit inserts are disposed in back-to-back relationship and form an insert assembly for insertion into the single chambered conduit.

6 Claims, 4 Drawing Figures

FIBER OPTIC DUCT INSERT

BACKGROUND OF THE INVENTION

The present invention relates generally to a conduit assembly utilized to house a fiber optic cable and, in particular, to a conduit insert utilized to convert a single chambered conduit into a multi-chambered conduit capable of housing a plurality of fiber optic cables.

The use of telephonic communication is increasing throughout the world. In the past, as telephone use increased, additional electrically conductive cable was installed to accommodate the increased demand. In most metropolitan areas, cable used in the telephonic industry is typically placed in underground conduits. Generally, the underground conduit has an annular cross-section and is formed of a plastic material such as polyvinylchloride, for example. A conduit formed of a plastic material has several advantages which include: (1) a high strength to weight ratio, (2) the conduit is effective in providing a moisture-proof environment for protecting the cable, and (3) the plastic material of the conduit is inert and therefore has a long life-cycle.

The increase in telephone use in certain highly populated areas has made it economical for the telephone companies to commence some significant and expensive changes in the mode of transmitting information telephonically. As mentioned above, the conventional medium used for conducting telephone messages has been cable formed of a plurality of individual electrically conductive wires. Many extraordinary developments have been made relating to increasing the efficiency of the telephone system by increasing the number of messages which can be conducted over a single wire. However, there are manifest limitations to the use of conventional, electrically conductive wires.

Recently, the telephone companies have had an additional option to consider when evaluating the parameters necessary to expand a given system to meet the increased demands. Fiber optics has presented an interesting possible option. Fiber optics can be successfully used for transmitting information by utilizing light energy, rather than electrical energy, as the conveyor of the information. Among the advantages of utilizing fiber optics is the increased rapidity in which information can be transmitted and the increased quanta of information which can be transmitted within a given cross-sectional area.

Therefore, at the point of time when the existing telephone cable network is at capacity and, in order to increase the capacity, the underground duct network would have to be replaced, fiber optics becomes a viable alternative. Since the physical characteristics of fiber optics are different from electrical cable, different handling and installation methods are required. For a number of reasons, it is considered beneficial to house fiber optic bundles in discrete housings rather than the conventional single chambered conduit used to house the previous electrically-conductive cable.

SUMMARY OF THE INVENTION

The present invention relates to a multi-chambered conduit insert which can be utilized to convert a single chambered conduit into a multi-chambered conduit. In particular, the conduit insert includes a plurality of cooperating longitudinally extending walls having curved outer surface portions and defining a plurality of parallel spaced apart coextensive chambers. When the conduit insert is inserted within the single chambered conduit, the curved outer surface portion of at least one of the chambers in the lower half of the insert is in line-to-line contact with the adjacent inner supporting surface of the single chambered conduit, thus causing only minimal contact with the interior wall of the existing conduit and enabling the multi-chambered conduit insert to be fed into the existing conduit with the expenditure of minimal energy. In the preferred embodiment of the invention, two identical conduit inserts are disposed in back-to-back relationship and form an insert assembly for insertion into the single chambered conduit.

It is an object of the present invention to produce a conduit assembly having a plurality of discrete chambers for containing separate arrays or bundles of light energy transmitting glass fibers or strands which comprise a typical fiber optic information transmission system.

Another object of the invention is to produce a conduit for use in the converting of an existing single chamber conduit into a conduit having a plurality of discrete individual chambers.

Another object of the invention is to produce a multi-chambered conduit insert assembly which may be readily inserted into an existing single chamber conduit.

Another object of the invention is to produce a multi-chambered conduit insert assembly having a cross-sectional configuration causing only minimal contact with the interior wall of an existing conduit, thereby enabling the multi-chambered conduit insert assembly to be inserted within the existing conduit with the expenditure of minimal energy.

Another object of the invention is to produce a multi-chambered conduit insert assembly formed of at least two identical inserts disposed in back-to-back relation in use within a single chambered conduit.

BRIEF DESCRIPTION OF THE DRAWINGS

The above, as well as other objects and advantages of the invention, will become readily manifest to those skilled in the art from reading the following detailed description of a preferred embodiment of the invention when considered in the light of the accompanying drawings, in which.

DETAILED DESCRIPTION OF THE PREFERRED EMBODIMENT

Figure 1:
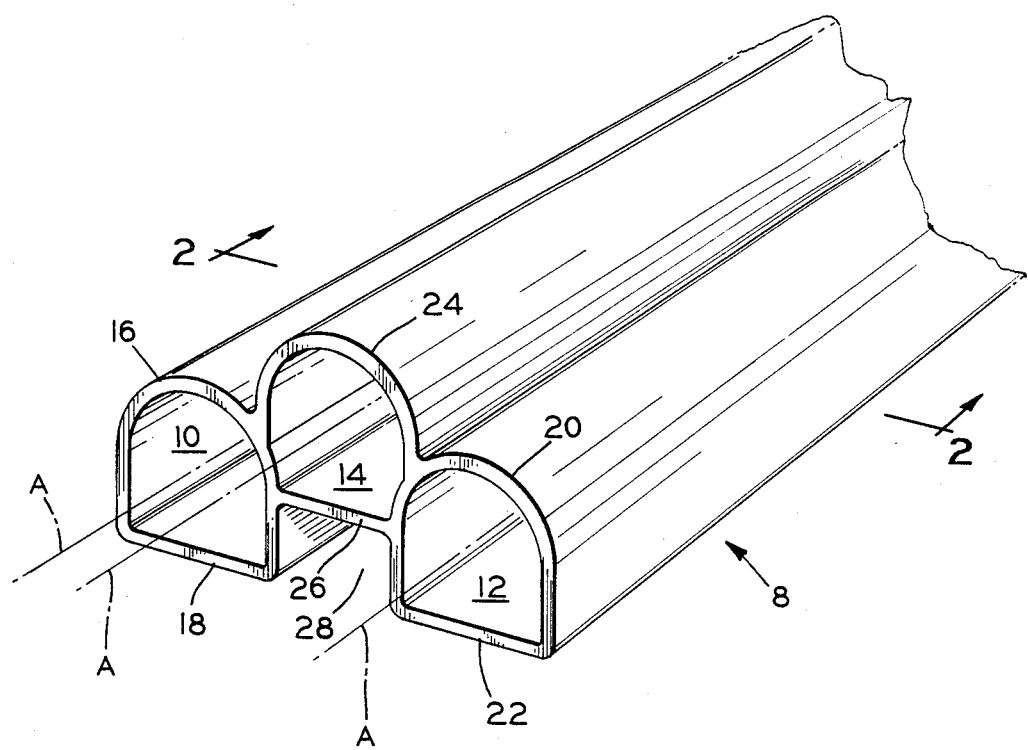
FIG. 1 is a perspective view of a multi-chambered conduit insert embodying the features of the present invention.
Figure 2:
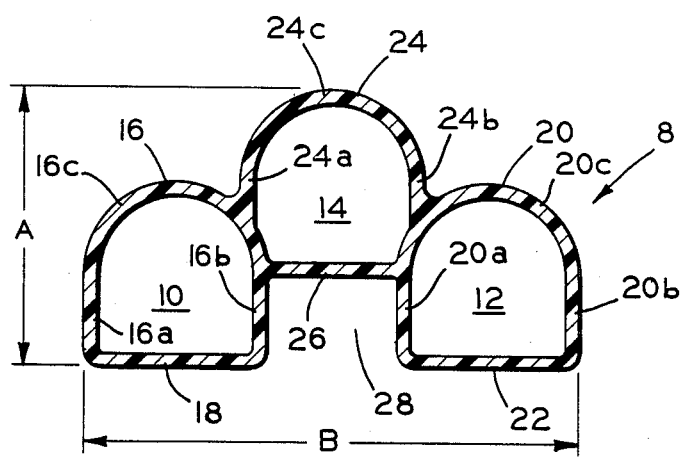
FIG. 2 is a cross-sectional view of the conduit insert illustrated in FIG. 1 taken along line 2—2 thereof.

FIGS. 1 and 2 disclose the preferred embodiment of a conduit insert 8 which includes a pair of spaced apart longitudinally extending chambers 10 and 12. The chamber 10 is defined by an arched-shaped outer wall 16 and a bottom or base wall 18 extending between the ends of the arched wall 16. Similarly, the chamber 12 is defined by an arched-shaped outer wall 20 and a bottom or base wall 22 extending between the ends of the arched wall 20.

Disposed between and typically integral with the chambers 10 and 12 is an intermediate chamber 14. The chamber 14 is defined by an arched outer wall 24 of a configuration similar to the outer walls 16 and 20 defining the chambers 10 and 12, respectively. The lower ends of the outer wall 24 merge with the outer walls 16 and 20, respectively. The bottom or base of the chamber 14 is defined by a laterally extending wall 26. The wall 26 cooperates with the facing portions of the walls 16 and 20 to form an open channel 28 having a cross-sectional configuration of an inverted U.

The arched wall 16 defining the chamber 10 includes first and second generally parallel side walls 16a and 16b joined at one of the respective edges thereof by a third wall 16c, and joined at the opposite edges thereof by the base wall 18. Also, the arched wall 20 defining the chamber 12 includes first and second generally parallel side walls 20a and 20b joined at one of the respective edges thereof by a third wall 20c, and joined at the opposite edges thereof by the base wall 22. Similarly, the arched wall 24 defining the intermediate chamber 14 includes first and second generally parallel side walls 24a and 24b joined at one of the respective edges thereof by a third wall 24c and joined at the opposite edges thereof by the base wall 26.

The structure illustrated in FIGS. 1 and 2 may be fabricated of a plastic material in continuous lengths by the known plastic extrusion processes. Satisfactory results may be achieved by utilizing a self-lubricating plastic material such as an olefin, for example. Low density polyethylene, a member of the olefin family, has been found to exhibit excellent results. The nature of the plastic material imparts to the finished product appropriate physical strength and inertness to moisture. Since the product can be formed in continuous lengths, the individual chambers of the formed product are capable of housing bundles of strands of fiber optic material in a discrete and protected state.

Typically, the inserts embodying the inventive features are employed for converting existing single chambered ducts having a nominal outside diameter of approximately four (4) inches into a multi-chambered duct. In such installations, the outer configuration of the insert is caused to contact the outer duct in only line-to-line contact with the inner wall surface of the duct being retrofitted as will become clearly manifest hereinafter. The typical cross-sectional dimensions of the insert member include a 0.08 inch wall thickness; the arcs of the arched walls 16, 20, 24 of the chambers 10, 12, 14, respectively, are struck on a 0.5 inch radius; the height dimension A (FIG. 2) is 1.725 inches; and the width dimension B (FIG. 2) is 3.17 inches.

Figure 3:
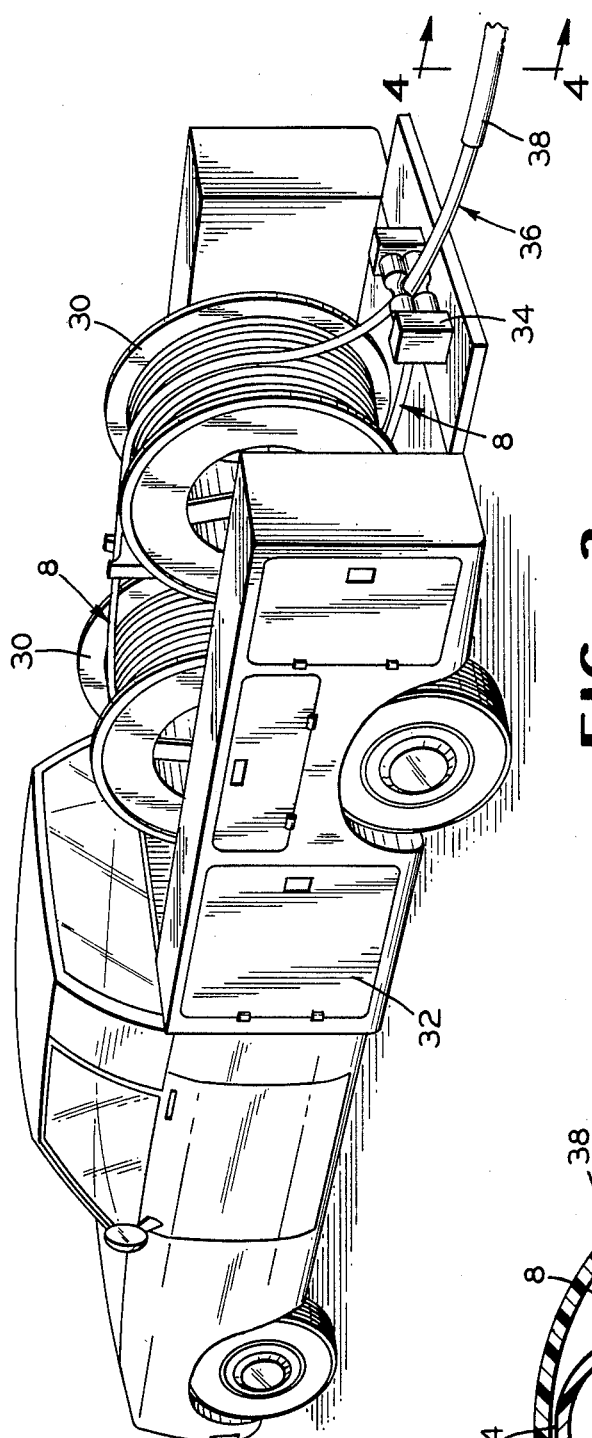
FIG. 3 is a perspective view of typical installation equipment for the conduit insert illustrated in FIGS. 1 and 2.

With the above described example, the extruded conduit inserts 8 of the invention may be coiled on separate reels 30 as illustrated in FIG. 3, at the point of manufacture. The coiled product on the reels 30 may be transported to a job site on a vehicle 32 of the type illustrated in FIG. 3.

Figure 4:
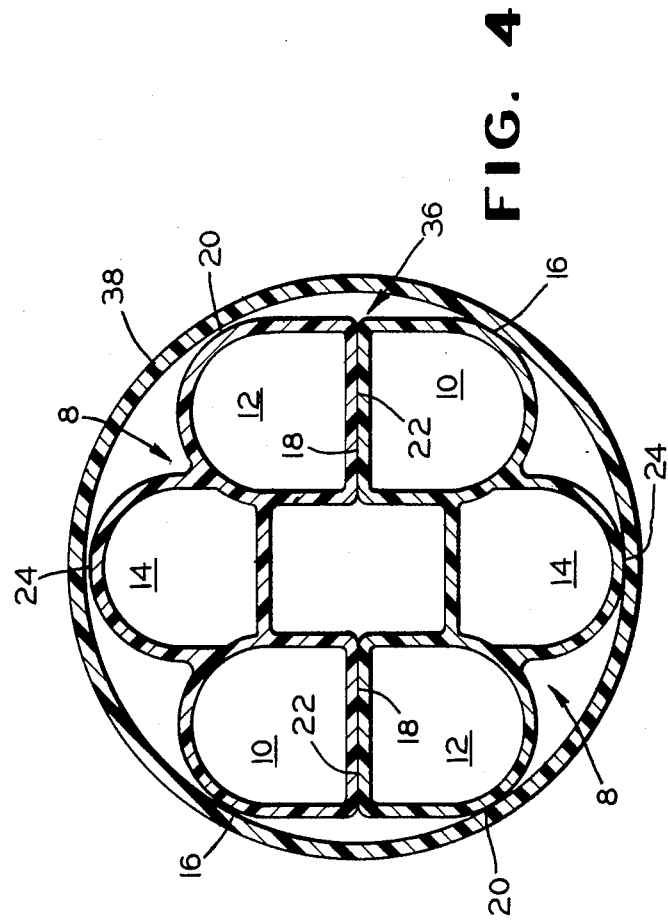
FIG. 4 is a sectional view of the conduit inserts illustrated in FIGS. 1 and 2 inserted into an existing duct in back-to-back relation.

The transporting vehicle 32 typically includes a mounting mechanism rotatably supporting at least two reels 30 and a suitable drive mechanism 34 for effecting a paying off of lengths of the individual conduit inserts in a back-to-back relationship as illustrated in FIG. 3. The inherent cross-sectional configuration of the individual inserts enables a single composite insert assembly 36 to be formed, as illustrated in FIG. 4, wherein the outer wall 18 of the uppermost insert is juxtaposed to the outer wall 22 of the lowermost insert, and the outer wall 22 of the uppermost insert is juxtaposed to the outer wall 18 of the lowermost insert. It will be appreciated that the composite insert assembly 36 contains six (6) individual discrete chambers for housing separate bundles of fiber optic cables.

The typical installation procedure utilizes a pulling clamp or halter arrangement secured to the leading end of the assembly 36 to be inserted. Thence, the inserted assembly 36 is pulled through the duct 38 by a suitable winch and cable arrangement. In FIG. 4, it will be noted that usually the contact between the composite insert assembly 36 and the inner wall surface of the duct 38 occurs between the curved outer surface portions of the lower insert 8 and the adjacent inner surface of the duct 38. More specifically, the contact between the inner wall of the duct 38 is effected at a point on the curved surfaces of the outer walls 16, 20, 24 which define the chambers 10, 12, 14, respectively. Thus, when the insert assembly 36 is inserted within the duct 38, at least one of the curved outer surface portions of the lower insert is in line-to-line contact with the inner annular supporting surface of the duct 38. Such contact assures a stable locating of the composite insert assembly 36 within the interior of the duct 38 and provides minimal surface-to-surface contact between the insert assembly 36 and the duct 38, thereby maintaining a low coefficient of friction between the composite insert assembly 36 and the duct 38 to facilitate the insertion or removal of the insert assembly 36 into or out of the associated duct 38.

While in the preferred embodiment of the invention shown in the drawings, the individual insert sections are adapted to be maintained in the desired position within the duct by means of the inner wall of the duct, it will be appreciated that means can be provided for attaching the two individual insert sections to one another prior to inserting the sections within the conduit. For example, the wall 18 of the insert section shown in FIG. 2 can be provided with a downwardly depending and longitudinally extending locking lug portion (not shown) which can be inserted into a cooperating locking lug receiving groove formed in adjacent outer wall portions of the cooperating lower insert section (not shown). Similarly, the outer wall 22 and the adjacent wall of the cooperating lower insert section can be provided with a similar locking device. In these instances, the space between the two locking means can provide an additional chamber.

Also, while not shown in the drawings, it may be desirable in some instances to provide a means for identifying the individual chambers. For example, an identification means such as one or more longitudinally extending ribs, for example, can be molded into the outer wall portion of each chamber to enable each chamber to be individually identified at any point along the entire length of the insert.

In accordance with the provisions of the patent statutes, the principles and mode of operation of the present invention have been illustrated and described in what is considered to represent its preferred embodiment. However, it should be understood that the invention may be practiced otherwise than as specifically illustrated and described without departing from its spirit or scope.

What is claimed is:

1. A multi-chambered conduit assembly comprising:

an outer conduit of generally annular cross-sectional configuration having a longitudinally extending internal passageway provided with an internal supporting surface; and a first and second insert, each of said inserts including spaced-apart, longitudinally extending parallel first and second chambers, the cross-sectional configuration of each chamber defined by first and second generally parallel side walls joined at one of the respective edges thereof by a third wall and joined at the opposite edges thereof by a base wall; and an intermediate chamber defined by first and second generally parallel side walls joined at one of the respective edges thereof by a third wall and joined at the opposite edges thereof by a base wall, the base wall of the intermediate chamber having one edge intersecting a side wall of the first chamber and an opposite edge intersecting a side wall of the second chamber, the intermediate chamber being parallel to and coextensive with the first and second chambers; said first and second inserts positioned in back-to-back relationship wherein the base wall of the first chamber of said first insert is adjacent the base wall of the second chamber of said second insert and the base wall of the second chamber of said first insert is adjacent the base wall of the first chamber of said second insert, said first and second inserts positioned within the internal passageway of said outer conduit such that the outer surface of the third wall of each of the chambers is adjacent to the inner supporting surface of the internal passageway of said outer conduit, each of the third walls having an outer surface configuration wherein if such third wall contacts the inner supporting surface of said conduit such contact is a singular line contact between such third wall and the inner supporting surface of said outer conduit, whereby frictional contact between said insert and the inner supporting surface of said outer conduit is minimized when said insert is inserted into said conduit.

2. The conduit assembly defined in claim 1 wherein the base walls of the first and second chambers are substantially flat and coplanar to one another.

3. The conduit assembly defined in claim 1 wherein the third walls of the first and second chambers each include a substantially semi-circular outer surface.

4. The invention defined in claim 1 wherein said walls of said first and second inserts are formed of a plastic material.

5. The invention defined in claim 4 wherein said plastic material is an olefin.

6. The invention defined in claim 4 wherein said plastic material is a low density polyethylene.

* * * * *

UNITED STATES PATENT AND TRADEMARK OFFICE
CERTIFICATE OF CORRECTION

PATENT NO. : 4,582,093
DATED : April 15, 1986
INVENTOR(S) : Charles E. Hubbard and Donald E. Berkemeier It is certified that error appears in the above-identified patent and that said Letters Patent are hereby corrected as shown below:

On title page, item [73], cancel "Libbey-Owens-Ford Company, Toledo, Ohio" and insert --LOF Plastics Inc., Troy, Michigan--

Col. 3, line 13, after "U." insert --Each of the chambers 10, 12, and 14, has a longitudinal axis A which is an imaginary line extending centrally of the chambers along the entire lengths thereof. Also, it will be noted that each of the chambers 10, 12, and 14 is of the same length and, therefore the chambers may be described as being coextensive with each other. The word "coextensive", as used throughout the description, simply means of equal length.--

Signed and Sealed this

Ninth Day of September 1986

[SEAL]

Attest:

DONALD J. QUIGG

Attesting Officer

Commissioner of Patents and Trademarks